Figure 8:
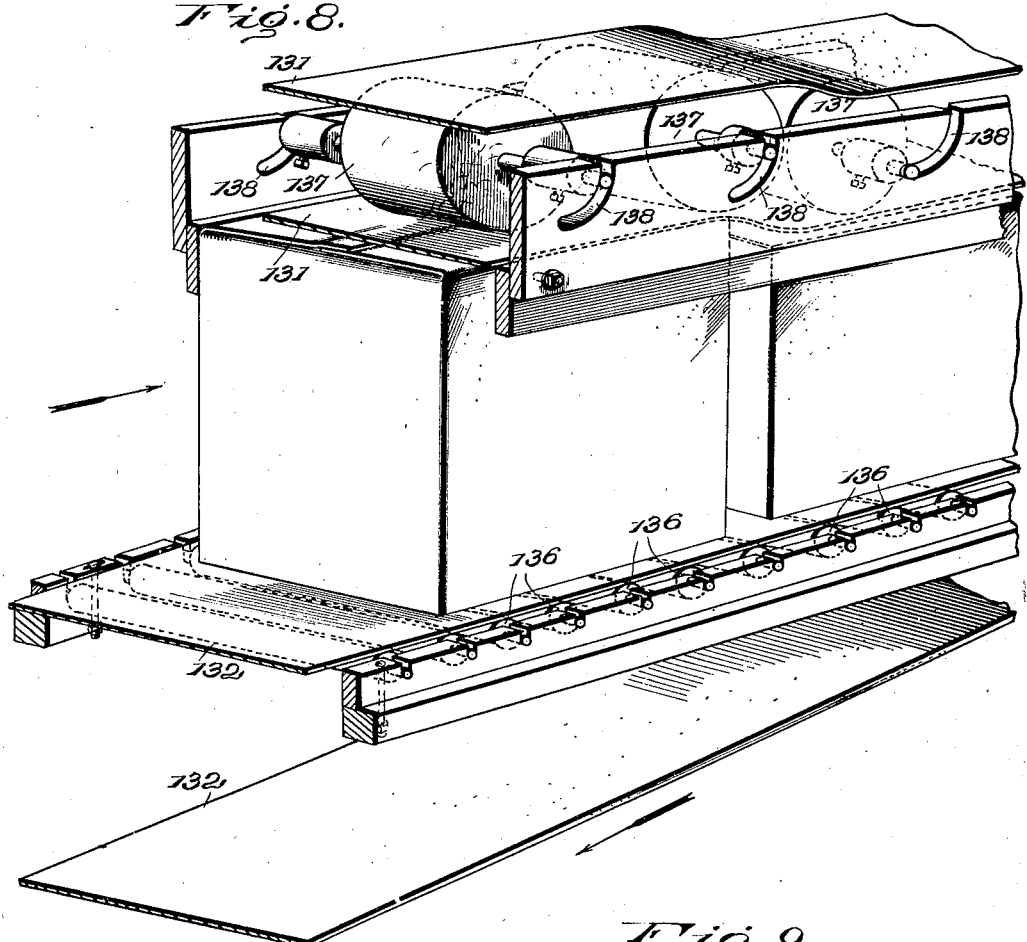

F. B. MARTIN.
CARTON SEALING MACHINE.
APPLICATION FILED NOV. 13, 1911.
1,094,451.
Patented Apr. 28, 1914.
10 SHEETS—SHEET 1.
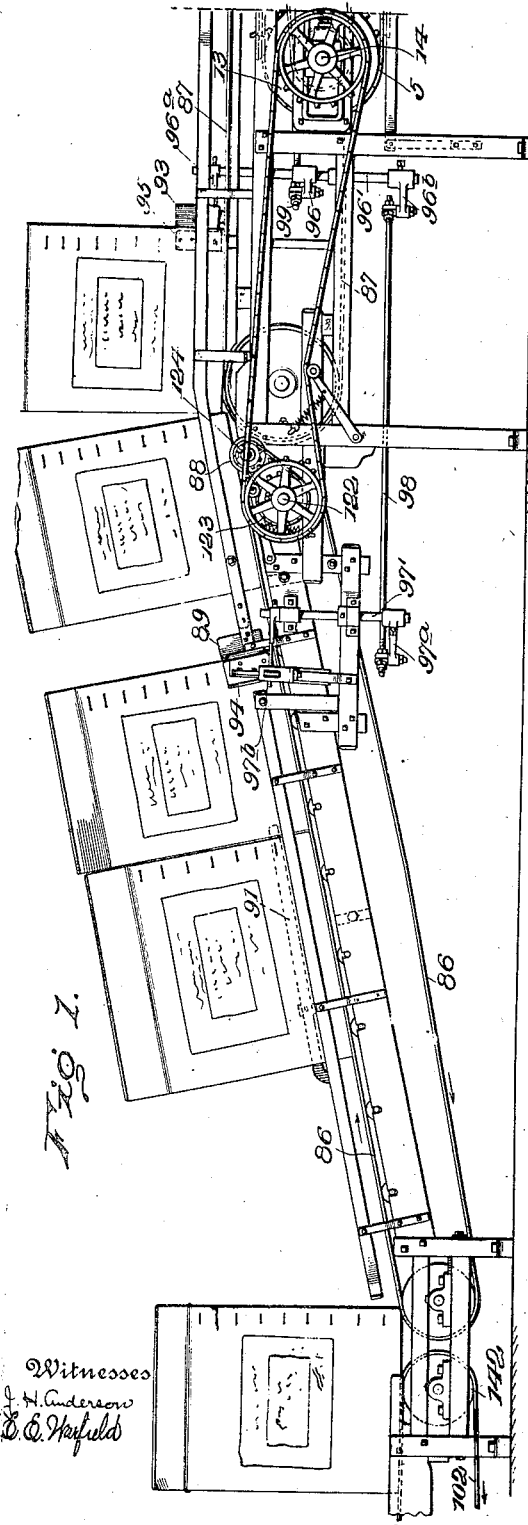
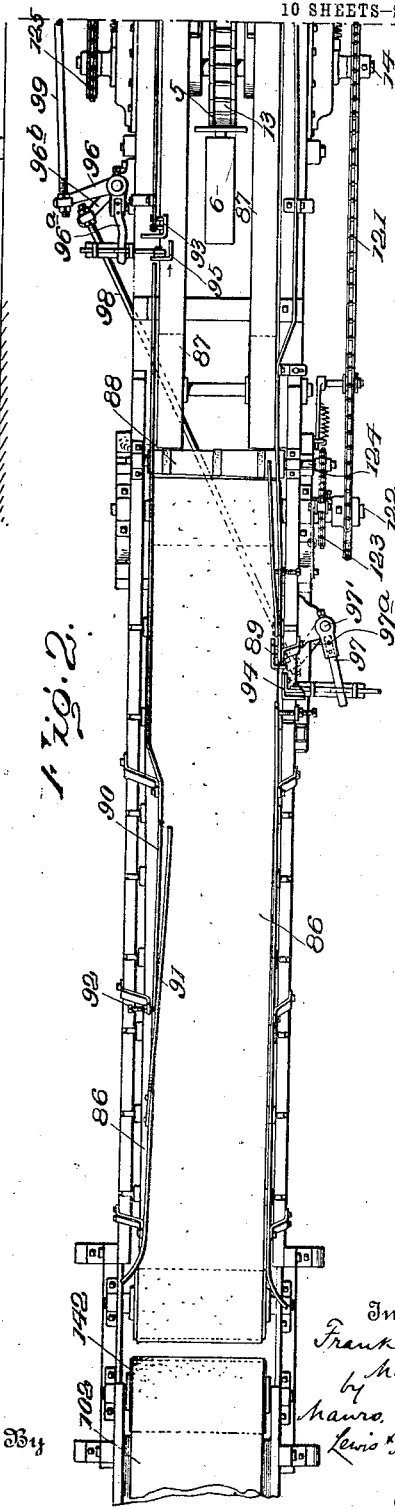

F. B. MARTIN.
CARTON SEALING MACHINE.
APPLICATION FILED NOV. 13, 1911.
1,094,451. Patented Apr. 28, 1914.
10 SHEETS—SHEET 2.
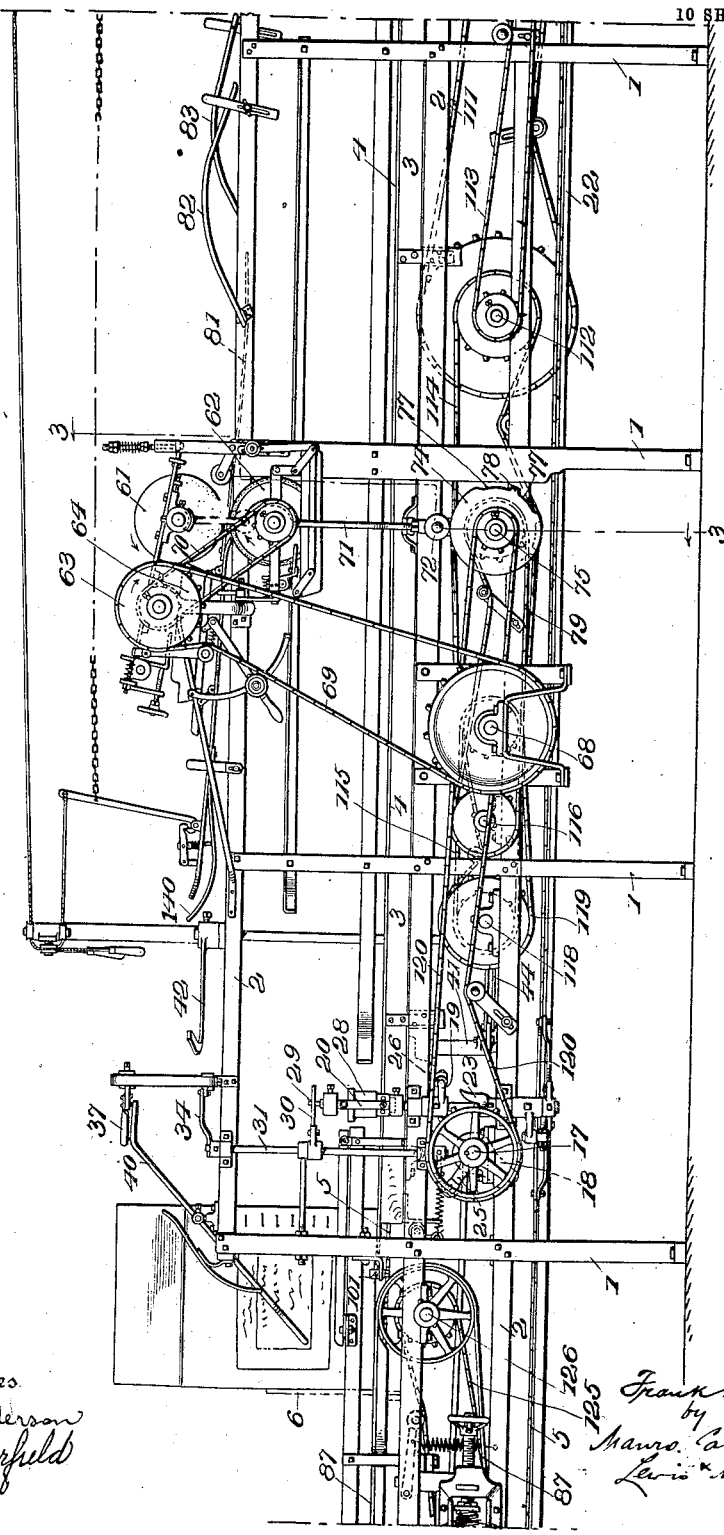
Witnesses
J. H. Anderson
O. E. Warfield
Inventor
Frank B. Martin
by
Munn, Cameron,
Lewis & Massie
Attorneys F. B. MARTIN.
CARTON SEALING MACHINE.
APPLICATION FILED NOV. 13, 1911.
1,094,451.
Patented Apr. 28, 1914.
10 SHEETS—SHEET 3.
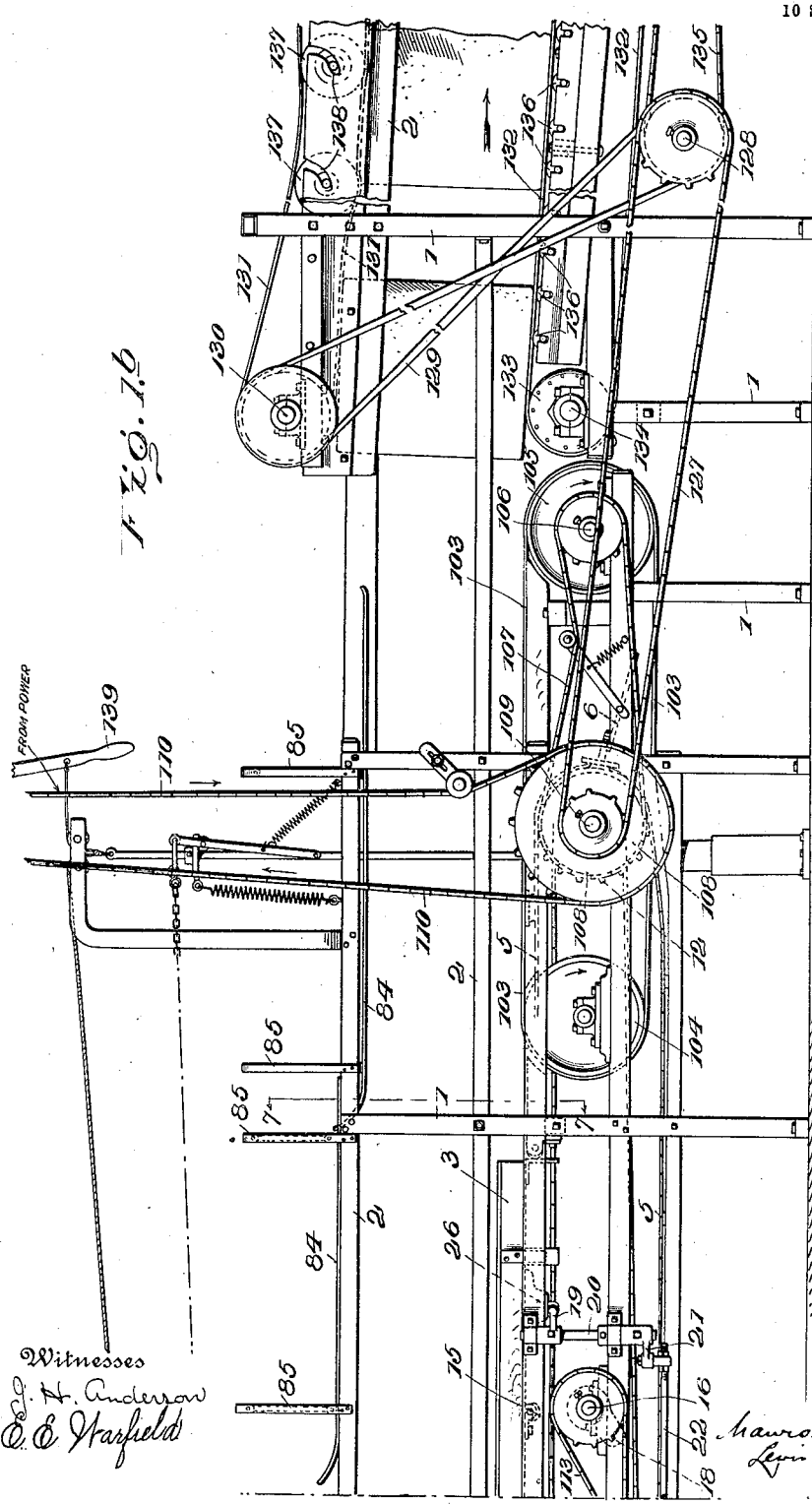

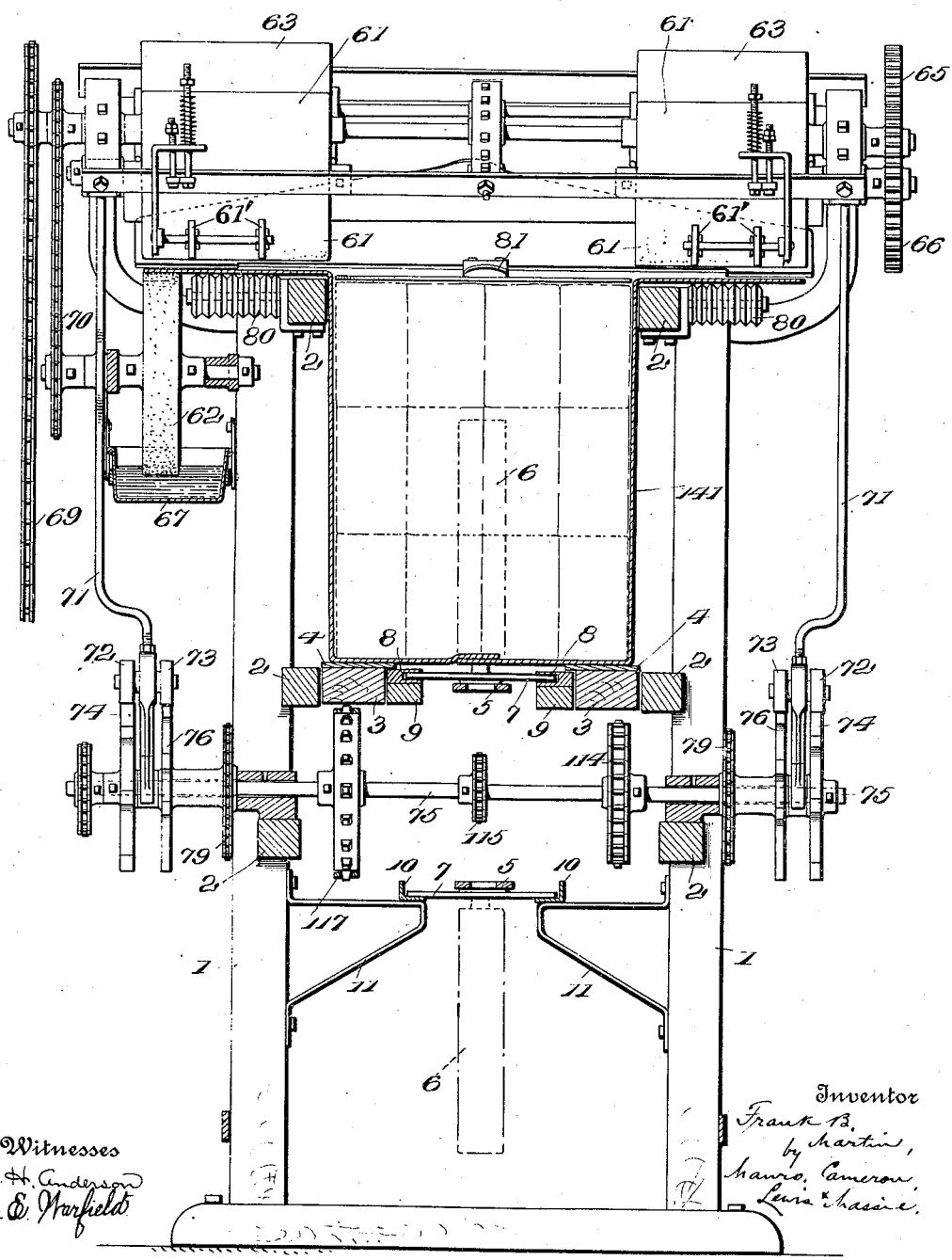

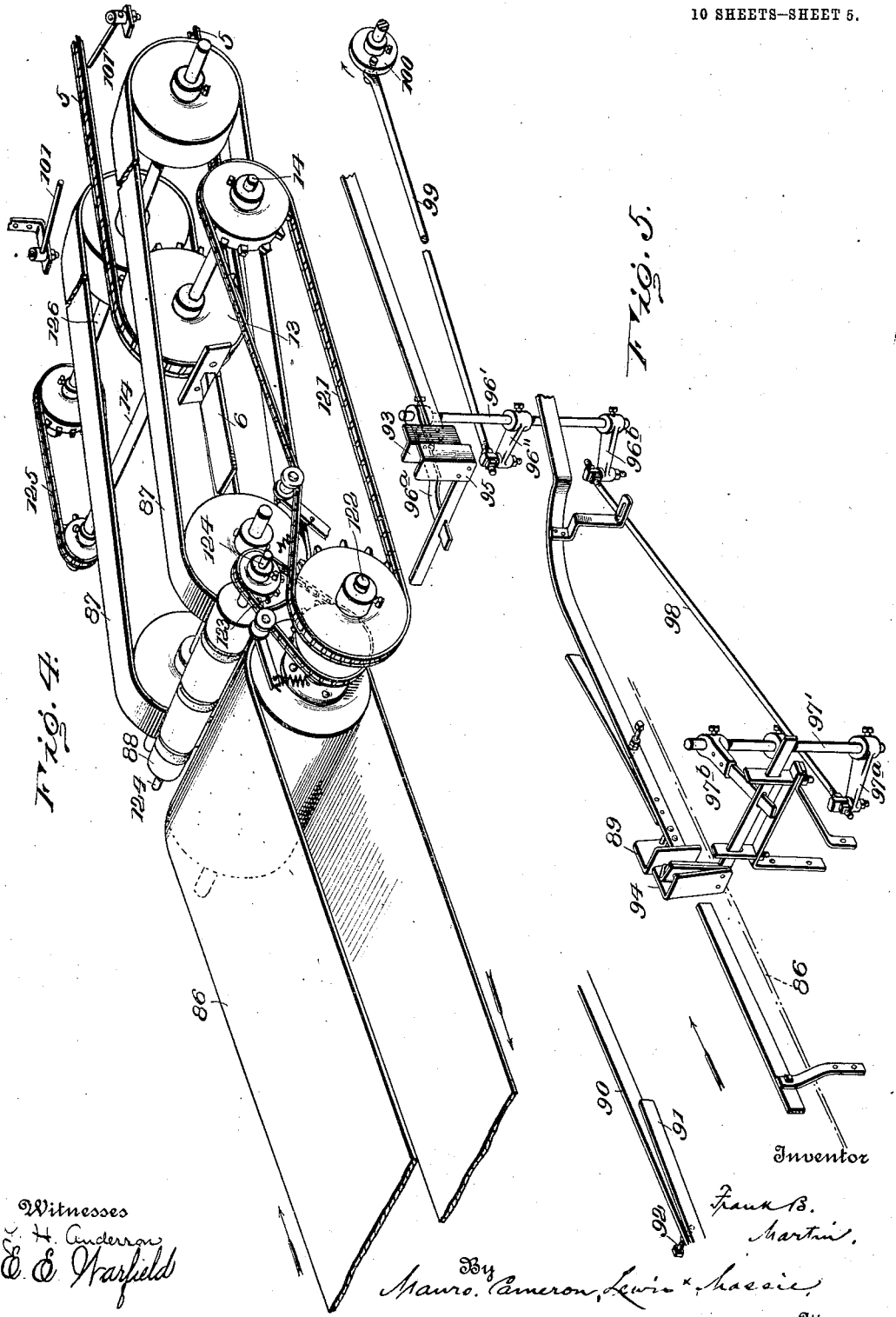

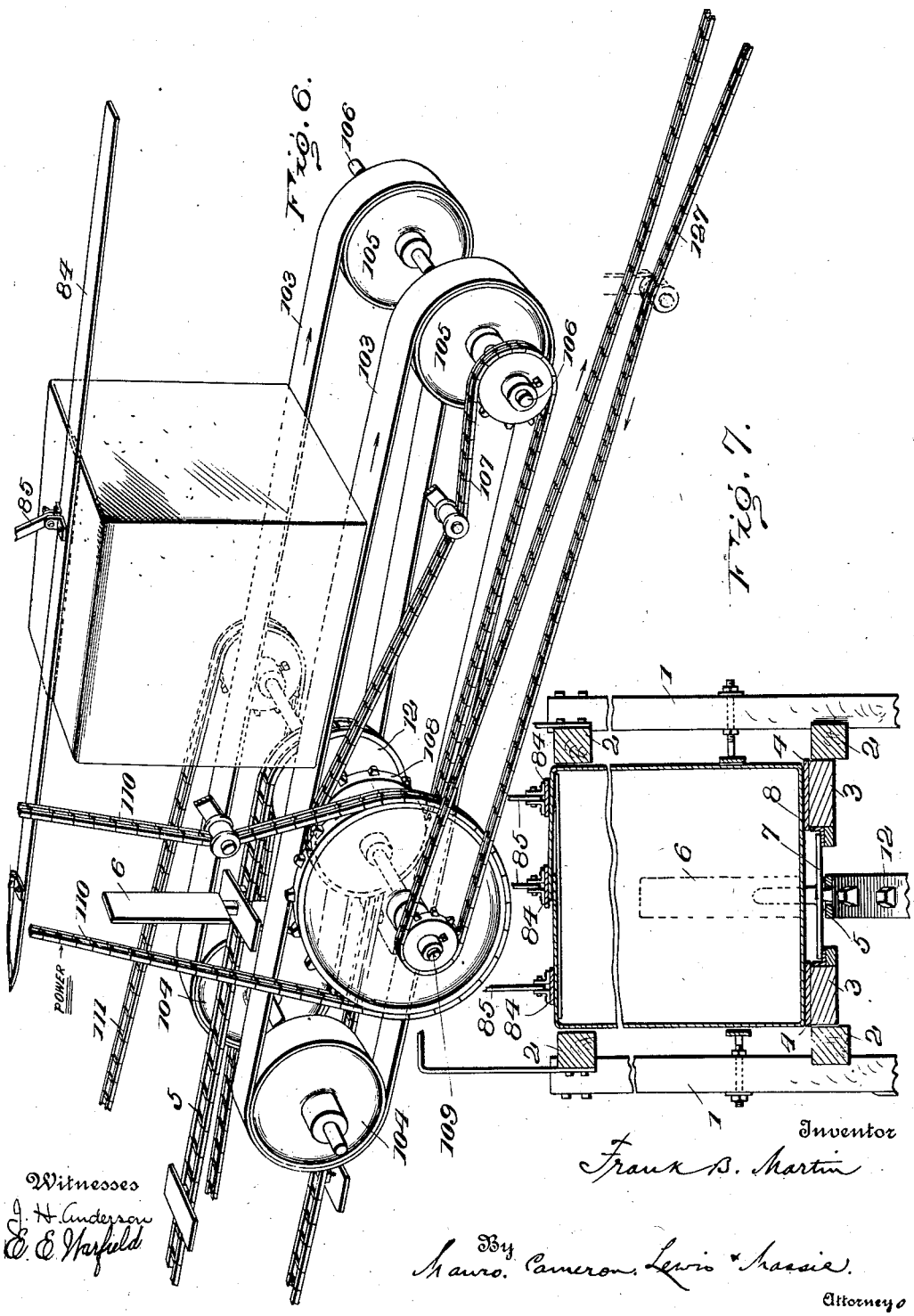

F. B. MARTIN.
CARTON SEALING MACHINE.
APPLICATION FILED NOV. 13, 1911.

1,094,451.

Patented Apr. 28, 1914.
10 SHEETS—SHEET 7.

F. B. MARTIN.
CARTON SEALING MACHINE.
APPLICATION FILED NOV. 13, 1911.
1,094,451.
Patented Apr. 28, 1914.
10 SHEETS—SHEET 8.
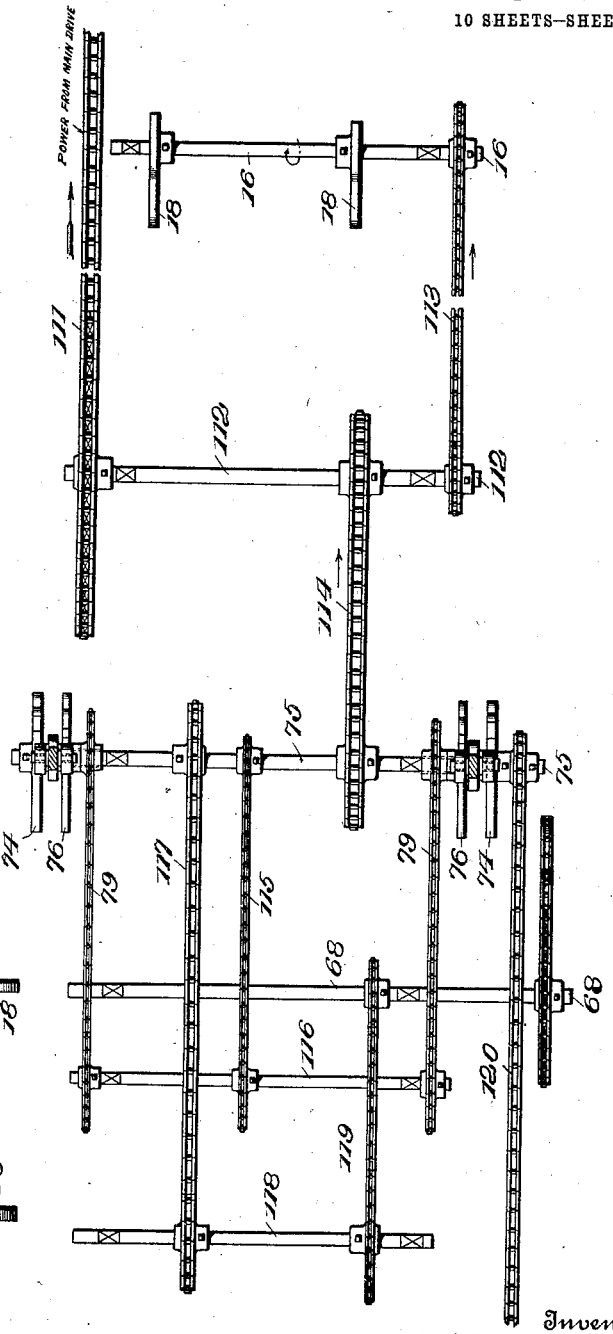
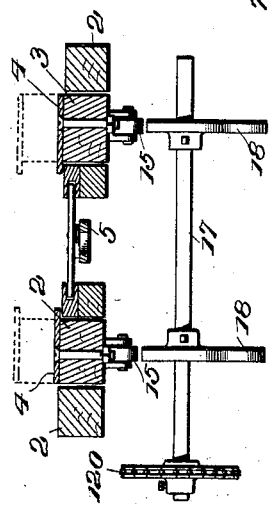

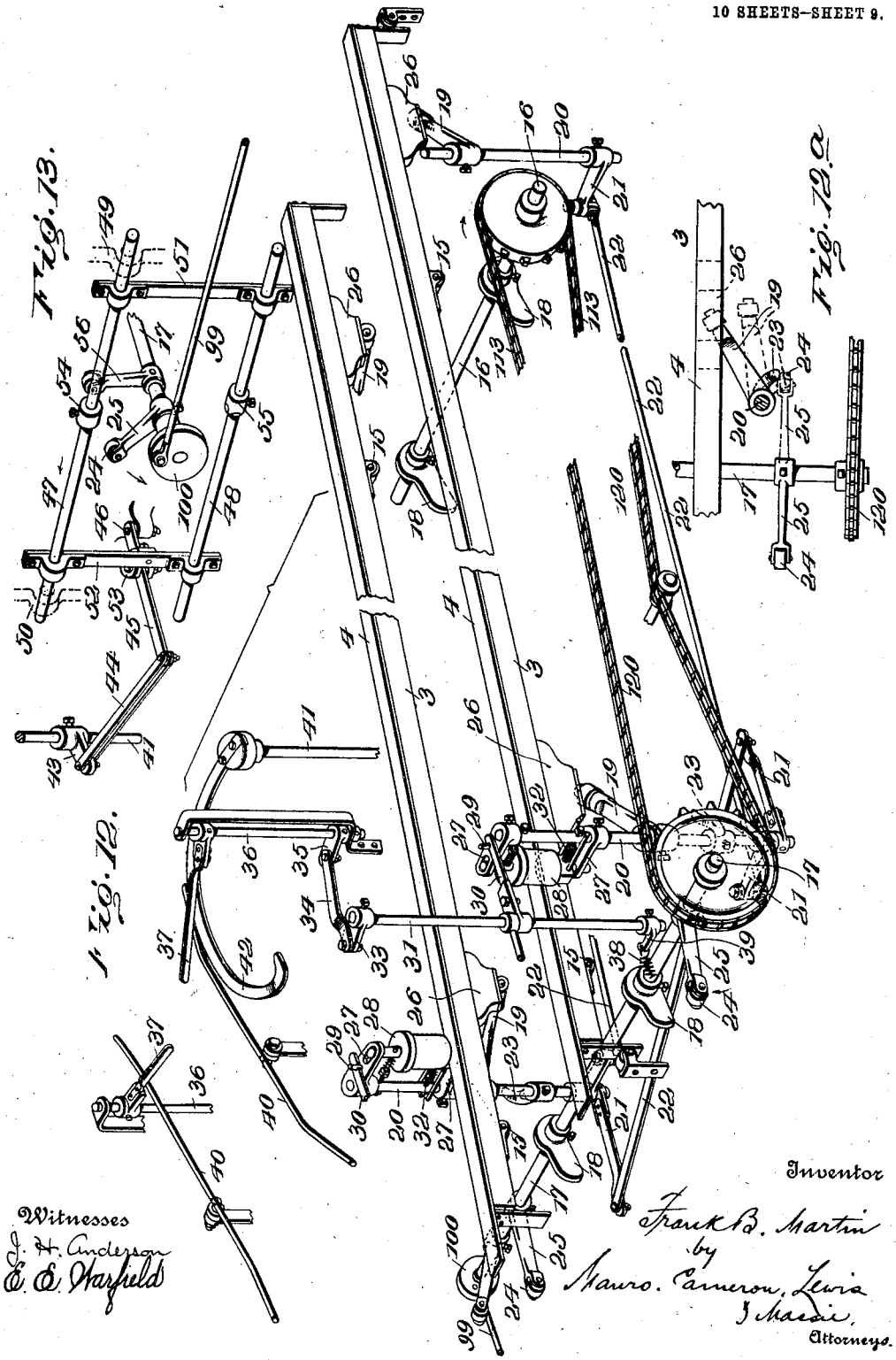

F. B. MARTIN.
CARTON SEALING MACHINE.
APPLICATION FILED NOV. 13, 1911.
1,094,451.
Patented Apr. 28, 1914.
10 SHEETS—SHEET 10.
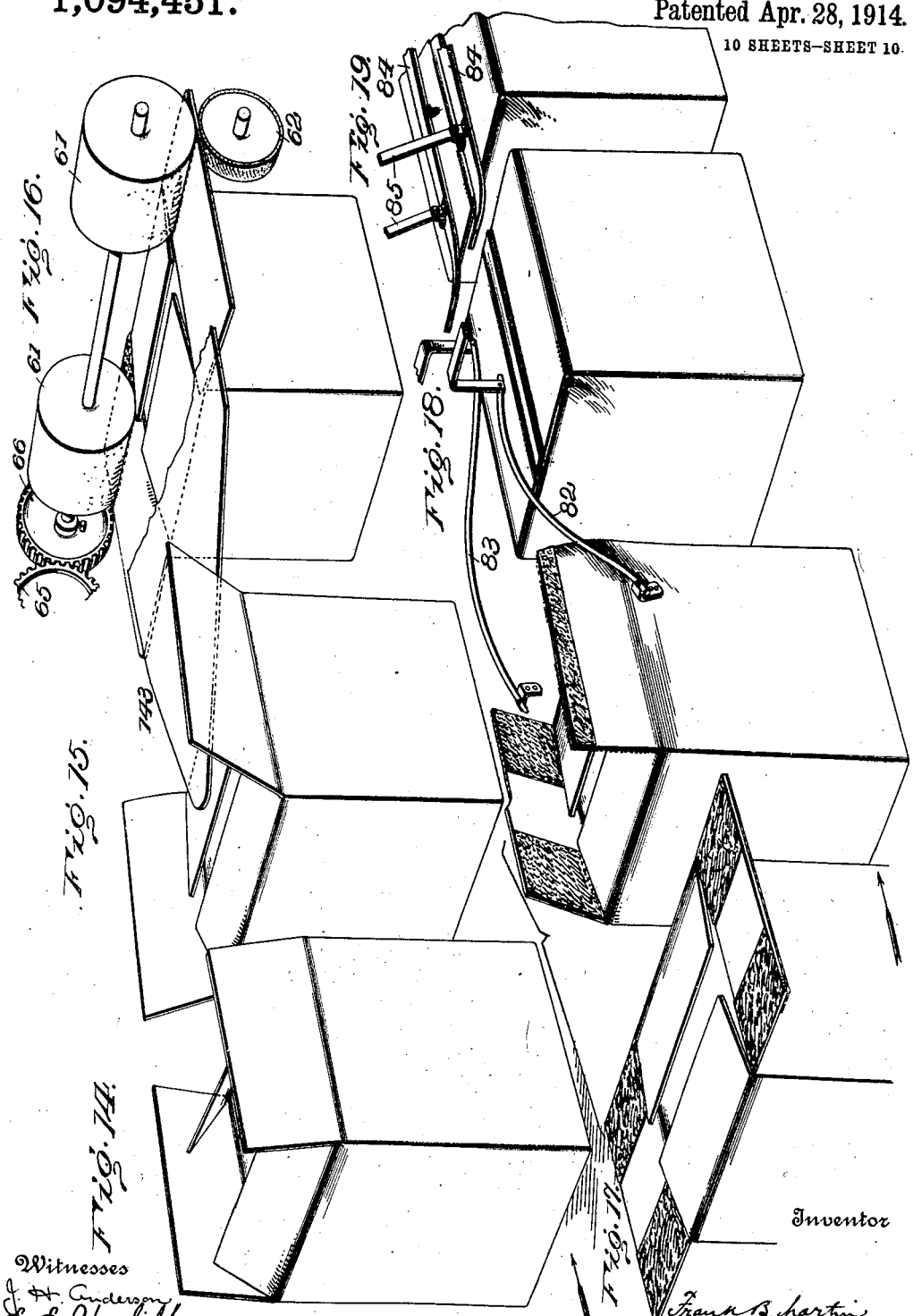

UNITED STATES PATENT OFFICE.

FRANK B. MARTIN, OF BATTLE CREEK, MICHIGAN, ASSIGNOR TO POSTUM CEREAL COMPANY LIMITED, OF BATTLE CREEK, MICHIGAN, A PARTNERSHIP ASSOCIATION.

CARTON-SEALING MACHINE.

1,094,451. Specification of Letters Patent. Patented Apr. 28, 1914.

Application filed November 13, 1911. Serial No. 659,928.

*To all whom it may concern:*

Be it known that I, FRANK B. MARTIN, of Battle Creek, Michigan, have invented a new and useful Improvement in Carton-Sealing Machines, which invention is fully set forth in the following specification.

This invention relates to means for closing and sealing the top flaps of pasteboard boxes, and more particularly of large pasteboard packing cases, though in many of its details the invention may be employed in connection with the sealing of the top flaps of any style of pasteboard box or carton.

In practical manufacturing operations, it frequently occurs that pasteboard packing cases of different sizes or dimensions are employed for packing goods, and one object of the present invention is to provide a machine which will automatically close and seal the top flaps of cartons of different sizes, and thereby obviate the necessity of employing a different machine for each different size of packing case or box.

In closing and sealing cartons, packing cases or other pasteboard boxes having top flaps, it has heretofore been common to advance the carton to suitable mechanism which folded in the front and rear flaps of the box or carton as the same was advanced, opened out the side flaps thereof, applied suitable adhesive to the said side flaps, and then folded the said side flaps one after the other inward over the end flaps, and applied suitable pressure to retain the side flaps in their closed or folded position, until the adhesive had effectually set.

The present invention contemplates closing and sealing pasteboard boxes, cartons or packing cases, provided with such end and side flaps, by the process just described, when the packing cases or cartons differ in size, without regard to the order in which the various-sized cartons may be presented to such devices. By this means, a single machine may be made to automatically take care of a plurality of sizes of cartons, and the consequent expense of duplicating the machine, with the incident increase in the factory floor space occupied, and the attendants therefor, entirely obviated.

With the objects above set forth in view, the invention consists in the details of construction and methods of operation hereinafter described and then specifically pointed out in the claims.

The invention is capable of receiving a variety of mechanical expressions, one of which, for the purpose of illustrating the invention, is shown in the accompanying drawings, but it is to be expressly understood that such drawings are designed for illustration only, and do not define the limits of the invention, reference being had to the claims for this purpose.

Figure 9:
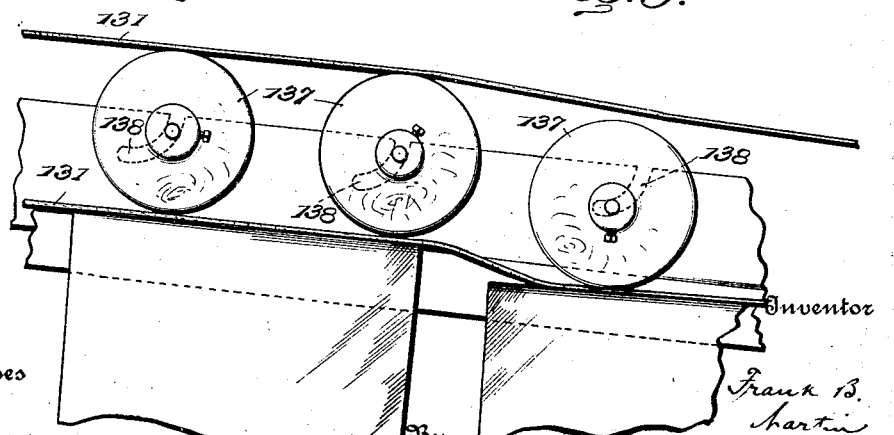

In the drawings, Figures 1, 1ª and 1ᵇ, when placed end to end, illustrate the machine in side elevation; Fig. 2 is a plan view of that part of the machine shown in Fig. 1; Fig. 3 is a transverse vertical section on the line 3—3 of Fig. 1ª; Fig. 4 is a detail in perspective of the feed mechanism of the machine, and Fig. 5 a perspective detail of the stops operating in connection with such feed mechanism; Fig. 6 is a detail of the delivery mechanism for carrying the sealed case out of the path of the follower on the carrier which advances the same through the sealing mechanism; Fig. 7 is a transverse vertical section through the machine on the line 7—7 of Fig. 1ᵇ; Fig. 8 is a broken detailed perspective showing the means employed for holding the top flaps down until the adhesive has set; Fig. 9 is a broken central longitudinal section through the top portion of Fig. 8; Fig. 10 is a cross-sectional detail showing the track upon which the cartons travel during the sealing operation, and the means for elevating and lowering the same; Fig. 11 is a plan view showing the means of applying power to the several shafts of the machine; Fig. 12 is a perspective view of the track which supports the case during the sealing operation, with the mechanism for operating the same; and Fig. 12ª is a broken detail; Fig. 13 is a broken detail illustrating the means for operating the rear end flap folder or tucker; and Figs. 14, 15, 16, 17, 18 and 19 are perspective views, arranged consecutively for the purpose of illustrating the operation of the device for closing and sealing the flaps.

Broadly defined, the machine embodying the invention consists of the combination into an operative whole of the following mechanisms, viz., the top flap sealing devices having a suitable carrier for passing the cases therethrough, and a vertically adjustable track along which the cases are advanced by said carrier during the sealing process; feed mechanism for properly supplying the cases to the carrier of the sealing mechanism; means for holding the closed flaps in proper position until the adhesive thereon has set, which means are automatically adjustable to the different heights or sizes of cartons; and means automatically shifting the cartons off of the carrier of the sealing mechanism in such manner as to avoid injury to the cartons by the said carrier. These several sets of mechanism will now be described in detail, after which I will state the manner in which the several sets of mechanism coöperate as a whole to effectually seal the different sized cartons, and deliver them from the machine without injury thereto.

*Flap securing mechanism.*—Referring to Figs. 1ª, 3, 12 and 13, the framework of the machine may be of any suitable construction, preferably consisting of a series of properly spaced uprights 1, 1, supporting horizontal and parallel side bars 2, 2. The cartons are advanced past the flap-folding, adhesive applying, and flap-sealing devices on a vertically adjustable track or way, consisting of two parallel horizontal bars 3, 3, preferably faced with steel plates 4, 4, the advance motion to the cartons being imparted thereto by a continuously-moving endless carrier, here shown in the form of an endless chain 5, provided with a plurality of followers 6. In the present instance, there are two of such followers, but manifestly any suitable number may be employed. The said chain is provided with laterally extending transverse bars 7, which bars in the upper stretch of the chain travel in guide grooves 8, preferably steel-faced, formed in two supporting parallel side rails 9, 9, while the lower stretch of the chain 5 is supported by the bars 7, traveling in guide-ways 10, 10, preferably formed of angle bars resting on suitable brackets 11, 11, supported on the uprights 1, 1, or other parts of the frame. Chain 5 is supported by the sprocket wheel 12 (Fig. 6) at one end, and a sprocket-wheel 13 at the other end (Fig. 4), which sprocket-wheel 13 is secured to and drives the shaft 14. Each of the rails 3, 3, has on its under side, and adjacent the two ends thereof, anti-friction rollers 15, 15, immediately over the two shafts 16 and 17, suitably supported in the framework of the machine, and having cams 18, 18, thereon, which, when the said shafts 16 and 17 are revolved, engage the rolls 15 on the under side of the track bars, and act to lift the same vertically. When the track bars are elevated by the cams 18, they are engaged and supported by arms 19, secured to vertical rocking shafts 20, which shafts are provided on their lower ends with crank arms 21 and connecting links or bars 22, secured to said crank arms in such way that the several rock-shafts 20 will operate in unison to throw the arms or fingers 19 under the track-bars 3, 3, or withdraw them therefrom, depending upon the direction in which the shafts 20 are rocked. One of the shafts 20 (see Figs. 12 and 12ª) is provided with a cam 23 secured thereto, which cam, when the arms 21 are withdrawn from under the track bars 3, 3, is in a position to be engaged by the anti-friction roll 24 on the end of an arm 25, secured to the shaft 17, the action of the arm 25 and the cam 23 being to turn the shaft 20 so as to throw the fingers or arms 19 under the bars 3, 3. Preferably, steel-faced blocks 26 are secured to the under-side of the bars 3, 3, and through these blocks the said bars are supported by the fingers or arms 19.

Keyed to two of the shafts 20 (Figs. 12 and 12ª) are crank-arms 27, 27, having between their outer ends anti-frictional rollers 28, carried on spring-pressed bearings, which normally hold the rollers out to the extreme ends of the crank arms, and immediately above the surface of the steel plates 4, 4, of the track. There are two of these rollers, one on each side of that end of the track where the carton enters, the rollers being in such a position over the track as to be in the pathway of the forward edges or corners of the advancing carton, the action of which is to push the rollers forward and outward over the track rails, thus revolving the rock-shafts 20, and thereby withdrawing the fingers or arms 19 from under the track, and permitting the same to fall. Projecting from the upper side of one of the upper crank arms 27 is a stud or pin 29, which is normally engaged by a notch or catch on the arm 30, secured to and turning with a rock-shaft 31, placed to the rear of the rollers 28, and as long as this catch 30 engages the stud 29, the rollers 28 are prevented from being advanced by the carton to revolve the shafts 20, and hence are forced outward, the springs 32 in the spring-bearings thereof yielding to permit this outward movement of the rollers. It follows that when catch 30 is engaging the stud 29, the shafts 20 cannot be revolved to withdraw the arms or fingers 19 from under the track, and the same remains in its elevated position. In its elevated position, the track is in a horizontal plane to present the top flaps of a low carton at the proper level to be acted upon by the top flap-sealing devices, and in its lowered position, the track is at the proper level to present the top flaps of a high carton in a proper plane to be acted upon by said sealing devices. For the purpose of actuating the shafts 20, 20, to withdraw the supporting arms or fingers 19 from under the track only when a high carton is on the track, means are provided for tripping the catch-arm 30 so as to release it from the stud or pin 29. For this purpose, a crank-arm 33 is keyed to the top of the shaft 31, and connected by a link 34 with a crank-arm 35 on a rocking shaft 36, which has a finger or lever-arm 37 projecting inward over the track in a horizontal plane, which is above the upwardly projecting side flaps of a low carton, but which is in the path of the upwardly projecting side flaps of a high carton. The low carton passes under the arm 37, and hence passes without tripping the catch 30, and therefore the shafts 20 remain locked against any rocking or turning movement, and the carton simply passes the rollers 28, 28, forcing them directly outward, the spring-pressed bearings yielding to permit the carton to pass. It follows that the track remains in its elevated position, because the supporting arms or fingers 19 are not withdrawn from under the same. On the other hand, when a high carton is advanced onto the track, its upwardly projecting side flaps engage the lever arms 37, and as the carton advances, rocks said arms in a forward direction, and this rocking movement is imparted by means of the connections to the catch arm 30 releasing the stud 29, so that the advancing carton engages the rollers 28 and rocks the shafts 20, 20, thereby withdrawing the fingers or arms 19 from under the track, permitting the same to fall until it strikes the smaller diameter of the cams 18. The timing of the parts is such that the track will remain in this lowered position until the carton has passed through the flap-sealing devices, when the track will again be raised, the supporting arms or fingers 19 positioned thereunder, and the catch-arm 30 returned to its position by the action of the spring 38 engaging the crank arm 39 on the shaft 31.

To insure that the side flaps on the carton will be raised in vertical position so as to engage the lever arms 37, inclined guide rails 40, 40, are provided on either side, which act to raise the side flaps of the carton into vertical position, as clearly shown at the left of Fig. 1ᵃ. As the carton is advanced, the front flap is engaged by a rearwardly projecting horizontal plate 143, which engages the flap and folds it downward over the carton. This plate tapers outward and is of sufficient width to pass between the side flaps, and acts to open them outward into a horizontal position. For the purpose of folding the rear end flap inward, a vertical rock shaft 41 is provided on one side of the machine, and has secured on its upper end a curved tucker arm 42. This shaft 21 is provided with means for giving it a quick inward movement as the carton advances past it, which movement acts to cause the tucker arm 42 to engage the rear end flap and fold it forward over the carton, after which the shaft 41 has a quick rocking movement imparted to it in the reverse direction, thereby withdrawing the tucker arm 42 out of the path of the next succeeding carton. For the purpose of imparting the proper rocking movement to the shaft 41, said shaft has a crank arm 43 (Fig. 13) keyed thereto, which is connected by a link 44 with a lever 45, pivoted at 46 to a part of the framework of the machine in the path of a part of a sliding frame consisting of two parallel bars 47 and 48, moving in brackets 49 and 50 on the frame of the machine. Secured to the bars 47 and 48 are two vertical frame members 51 and 52, the bar 52 having suitable lugs 53 through which a pin is passed engaging the lever 45 between its fulcrum 46 and the point where it is connected to the link 44. On the rods 47 and 48 are adjustable collars 54 and 55, respectively, keyed thereto by the use of set screws or any suitable means, so that the same may be adjusted on the rods. These collars 54 and 55 are adjusted into position to be engaged by the end of an arm 56, on shaft 17. When the end of the arm 56 engages the collar 54, the entire framework, and with it the lever 45, is quickly shifted to the left, thereby quickly rocking the shaft 41, and as quickly throwing the tucker arm 42 outward. When the end of the arm 56 engages the collar 55, the former is quickly thrown from left to right (Fig. 13), thereby imparting a quick turning movement to the shaft 41, and quickly throwing the tucker 42 inward to turn down the rear end flap of the carton. By this means the tucker is given the quick inward movement necessary to fold down the flap, and is as quickly withdrawn, the timing of the entire movement being secured by the adjustment of the collars 54 and 55.

When the side flaps of the carton are turned outward, they are passed to the glue rolls. Rolls 61 apply the glue to that surface of the flaps which is to be the inner surface when the same are closed, and the glue roll 62 applies a narrow strip of glue to the outer edge portion of what is to be the upper side of that flap which is to be first folded. Glue is applied to the roller 61 through the medium of a distributing roll 63, which travels with its lower surface in a tank or reservoir 64 containing liquid glue, the two rolls 61 and 63 being geared together by the gears 65 and 66 (Fig. 3), so as to be driven at the same rate of speed. Glue roll 62 receives its supply of glue from a suitable glue reservoir 67 (Fig. 3). The several glue rolls are driven from a shaft 68 by a sprocket-chain 69, extending from said shaft to a sprocket on the roll 63, and a second sprocket-chain 70 extending from the shaft of said roll 63 to the shaft of the roll 62. The roll 62 remains in continuous contact with the under-side of one of the side flaps as the carton passes the same, placing a narrow continuous strip of glue along the margin of the under-side of said side flap.

There are two of the rolls 61 and 63, one on either side of the machine, and means are provided for lifting the rolls 61, 61, from contact with the side flaps of the carton over the middle portion of said flaps, so that glue is only applied to the end portions thereof. For the purpose of lifting the rolls 61 from contact with the side flaps at the proper time, said rolls 61 have the shaft on which they are secured turning in bearings in a frame mounted to turn around the axes of the rolls 63, and the outer edge of said frame is engaged by two vertically depending rods 71, 71. Each of these rods has on its lower end two rollers 72 and 73. The rollers 72 engage cams 74 fast on a shaft 75, while the rollers 73 engage cams 76 turning loosely on said shaft. Each of the cams 74 and 76 has two cut-out cam surfaces 77, (Fig. 1ª), with an intervening portion 78 of substantially the same diameter as the greater diameter of the cam. The gearing of the driving mechanism for these two cams is such that cam 74 makes two revolutions while the cam 76 makes one, the cam 74 being driven by the shaft 75, and the cam 76 by a sprocket and chain gear 79. When the rolls 72 rest upon the periphery of either of the cams at its greatest diameter, the glue rolls 61 are elevated so that they cannot contact with the side flaps of the carton, and hence no glue is applied thereto. When the rolls 72 descend into the cut-out portions 77, the glue rolls contact with the side flaps of the carton and apply the glue. It will be observed that this descending action of the glue rolls for applying glue to the flaps can occur only at a time when the cut-out portion 77 on the two cams 74 and 76 coincide, and hence can occur only once for every revolution of the cam 76, and once for every two revolutions of the cam 74, the intermediate cam surfaces 78 serving to lift the glue rolls 61 momentarily, and then to again permit them to descend, so that the glue is applied only at the front and rear portion of the flaps, the intermediate portion being left free from glue. The action of the glue roll 62, however, is continuous, since it applies glue to what will be the upper or outer side of one of the flaps when closed, and there is no danger of this glue coming into contact with the contents of the carton. The spring pressed rollers 61' serve to hold the side flaps down when the rolls 61 are raised, and also keep the one side flap in contact with roll 62. During the time when the side flaps are passing under the glue rolls 61, they are supported in any suitable manner, preferably by corrugated loose rolls 80 (Fig. 3). After the carton passes from under the glue rolls, the front and rear end flaps are held down in proper position by a forwardly extending plate 81, shown in dotted lines in Fig. 1ª, and the side flap to which the glue has been applied by the rolls 62 is first turned over by a flap-folding member 82 (Fig. 1ª), which is preferably in the form of a rod having a compound curve shaped something like the outline of a mold-board, which first raises the flap, and then turns it over upon the carton in a way well understood in this art. Immediately after said first side flap has been folded, the second side flap is engaged and folded by a similar folding device 83, after which the carton passes free from the folders, and is advanced along the track 3, 3, and for the purpose of preventing the flaps from rising, suitable means are provided for engaging the same. As here shown, these holding means consist of bars 84, suspended from swinging arms 85, shown in dotted lines in Fig. 1ᵇ. Preferably, there is first a bar centrally hung over the cartons, and immediately to the front thereof are two bars 84, though, if desired, these may be formed as a single bar. The manner in which these bars act to engage and hold the flaps in closely sealed position, is fully illustrated in Figs. 1ᵇ, 6 and 19. It will be observed that as the bars are of considerable weight, and have a swinging motion with the rear end of the bars slightly turned or beveled upward, the carton will freely pass under the bars, and the bars will rest by gravity upon the flaps of the case, and retain the same until they are delivered from the tracks 3, 3.

*Means for feeding the cases to the sealing mechanism.*—Referring to Figs. 4 and 5, when the cartons are filled, they are placed on any suitable conveyer, as belt 86, by which they are advanced to two parallel feed belts 87, 87, whose forward portions lie on opposite sides of the chain 5. These belts are so geared to the driving mechanism that they move at a more rapid rate than the chain 5, and have their rear end portions closely adjacent to the delivery end of the belt 86, a driven roll 88 being preferably introduced between the belt 86 and the belts 87, 87, as clearly shown in Fig. 4, in order to facilitate the passage of the cartons from said belt 86 to said belts 87.

Referring in Figs. 1, 2, 4 and 5, 89 is a stop, which will be engaged by the carton as it is advanced by the belt 86, the carton being thrown over against the stop 89 by the guide rails 90, preferably assisted by a spring blade 91 secured to the guide rails, the tension and position of which spring may be adjusted by a set screw 92. A second stop 93 is provided to engage and stop the case immediately after it passes upon the belts 87. Means are provided for disengaging the cartons from the stops 89 and 93, which means, as here shown, consist of pusher plates 94 and 95, mounted to reciprocate horizontally in a plane above the belts 86 and 87 respectively. The pusher bar 95 is actuated by a bell crank lever 96, and the pusher bar 94 by bell crank lever 97, which two bell crank levers are connected by a rod 98, and motion is imparted to the bell crank lever 96 by a reciprocating rod 99 actuated by an eccentric 100 on the shaft 17 bearing the cams 18, 18, which act to raise the track 3, 3.

While I have referred to "bell cranks" 96 and 97 for actuating the pusher plates 94 and 95, these parts may be, and preferably are, as illustrated in Fig. 5, where the bell crank 96 consists of a vertical shaft 96′ having an arm 96″ keyed thereto, to which the actuating rod 99 is secured, and having an arm 96ᵃ also keyed to the shaft, and engaging the pusher plate 95. On the lower end of the shaft 96′ is another arm 96ᵇ, to which the rod 98 is connected. The "bell crank" 97 may be, and preferably is, composed of a vertical shaft 97′, mounted to turn in suitable bearings, and having keyed thereto an arm 97ᵃ, to which is connected the rod 98, and also the actuating bar 97ᵇ, which engages the pusher 94, as shown. In effect, this construction gives an adjustable bell crank, so that the parts may be readily adjusted by means of the set screws by which the several arms are secured on the shafts 96′ and 97′, to cause the pusher plates 94 and 95 to move inward and outward at proper times. Fig. 5 is designed to show this stop mechanism in diagrammatic perspective, while Fig. 2 shows the same in position over the belts. As the cartons are advanced by the belt 86, which, if desired, may be upwardly inclined, as shown in Fig. 1, they are engaged by the stop 89, and no matter how rapidly or how many cartons are thus advanced up the belt, the entire line will be held waiting, and the cartons will be liberated one at a time by the action of the pusher plate 94, which releases the forward carton from engagement with the stop 89. The carton being released is advanced by the belt 86 and the roller 88 onto the belts 87, and is then engaged by the stop 93. It is retained in this position until one follower 6 on the chain 5 has been raised into horizontal position and advanced toward the sealing mechanism. Immediately after the follower 6 has thus been raised, the pusher plate 95 is actuated to push the carton off of the stop 93, when it is quickly carried forward by the belts 87, 87, to the forward end of said belts, and off of the belts, with the forward portion of the cartons resting on the tracks 3, 3. In thus passing from the belts 87 to the tracks 3, the carton passes over two figures 101, 101 (Fig. 4), which support the rear end of the carton entirely free from the belts 87. The carton comes to rest upon the tracks 3, 3, and remains in this position until the next follower 6 upon the chain 5 rises to the rear of the carton, and advances it to and past the sealing mechanism, as described. Immediately after the follower 6 rises to thus advance the carton past the sealing mechanism, the pusher plate 95 is again actuated to release another carton, and permit it to be advanced by the belts 87 onto the tracks 3, to be picked up and carried forward by the next succeeding follower on the chain 5, and by reason of the connection between the pusher plates 94 and 95 and the stops 89 and 93, one carton is released from the stop 89 every time a carton is released from the stop 93. By this means the cartons are fed one at a time onto the tracks 3, 3, in position to be picked up and advanced along the tracks by the followers 6 on the chain 5.

I have shown on the left-hand end of Fig. 1, a belt 102 for delivering cartons to the belt 86. This is a convenient means, but the cartons may be delivered to the belt 86 in any suitable way. The advantage of employing the belt 102 resides in the fact that a long belt may be placed in front of the tables where the operatives are packing small cartons into these larger cartons, and as soon as the carton is thus filled and ready for sealing, it may be pushed off of the table by the operative onto the belt 102, and no further attention need be paid thereto. Moreover, the cartons may be, as in the present instance, of two sizes, a high and a low one, so that two classes of goods, or cartons containing different sizes of cartons of the same goods, may be simultaneously put through the sealing mechanism, and the same automatically sealed without any attention from the operative whatever.

*Delivery mechanism.—* On either side of the forward portion of the chain 5 are arranged two belts 103, 103 (see Fig. 6), which are driven by suitable sprocket-wheel and chain connections at a considerably more rapid rate than the chain 5. The forward portion of these belts 103 extends considerably in advance of the forward sprocket-wheel 12, around which the chain 5 and the follower 6 turn, and as soon as the follower 6 has advanced the carton upon the belts 103, a quick forward movement is imparted to the carton by the belts, and it moves away from the follower 6, as clearly illustrated in Fig. 6. By the time the follower reaches the point where it is about to turn around the wheel 12, the carton has advanced so far in front of the follower that the follower can freely make the turn without contacting with the carton. By this means is avoided the damage to the carton which might otherwise occur by reason of the end of the follower 6 punching into the end of the carton, and possibly making a hole therein. The rear end portions of the belts 103 pass over idler pulleys 104, and in the forward end over pulleys 105 fast on a shaft 106, driven by a sprocket-chain 107, through a sprocket-wheel 108 fast on main drive shaft 109, driven by a sprocket-chain 110, extending to the source of power. This main drive shaft 109 is the shaft which drives the sprocket-wheel 12 for imparting movement to the chain 5. This shaft 109 is the main drive shaft of the machine, and from it extends a chain 111 (Figs. 6 and 11), to a sprocket-wheel on a shaft 112, and from the shaft 112 extends a sprocket-chain 113, driving the shaft 16, which carries the cams 18 for raising the forward end of the track 3. A sprocket-chain 114, extending from the shaft 112 rearward, drives the shaft 75, which shaft drives the cams 74, 74, fast thereon. A sprocket-chain 115 extends rearward from the shaft 75, and drives shaft 116, from which shaft the cams 76, loose on the shaft 75, are driven through the medium of the chains 79, as heretofore described. Extending rearward from the shaft 75 is also a sprocket-chain 117, which drives shaft 118, and from this shaft 118 extends forward a sprocket-chain 119, driving shaft 68, which drives the glue rolls through the sprocket-chain 69, as heretofore described. Still another sprocket-chain 120 (Fig. 11) extends rearward from the end of shaft 75, and drives shaft 17 bearing the cams 18 for elevating the rear end of the track 3, 3 (see Figs. 1ª, 10 and 11). The conveyer chain 5, which, as before stated, is driven by the sprocket wheel 12 on the main drive shaft 109, passes at its rear end around the sprocket-wheel 13 (see right-hand end of Fig. 1), fast on the shaft 14. A sprocket-chain 121 extends rearwardly from one end of the shaft 14, and drives the shaft 122 for imparting motion to the belt 86, while a sprocket-chain 123 extends from the shaft 122 to the shaft 124 for driving the roller 88. Another sprocket-chain 125 extends forward from the shaft 14, and drives shaft 126 for imparting movement to the two feed belts 87, 87.

Referring to Figs. 1ᵇ, 8 and 9, sprocket-chain 127 extends forward from the shaft 109, and drives shaft 128, from which latter shaft belt 129 extends upward to the top of the machine, and drives shaft 130. A pulley on the shaft 130 receives a wide belt 131, extending forward to the discharge end of the machine (not shown), where it passes around another pulley, said belt 131 being permitted to sag or hang quite loosely between the two pulleys. Another belt 132 passes around a pulley 133 on a shaft 134, mounted in the frame of the machine, at a distance below the shaft 130 approximately equal to the height of the highest carton to be passed through the machine. This belt 132 extends forward around a suitable drive pulley, not shown, to which power is imparted by sprocket-chain 135 (Fig. 1ᵇ), extending forward from the shaft 128. Mounted in the framework of the machine, immediately below the upper stretch of the belt 132, is a series of closely spaced rollers 136, on which the belt 132 is supported. Mounted in the framework of the machine, between the upper and lower stretches of the belt 131, is a series of rolls 137, whose axes turn in bearing slots 138, formed in the side frame of the machine. The said slots 138 are curved forwardly and upwardly, approximately in the quadrant of a circle, so that the rolls, which are of considerable weight, are free to rise and fall in the slots, as hereinafter described. The bottoms of the slots are so located that the rolls will act to press the lower stretch of the belt 131 onto the upper surface of the sealed flaps of the lowest cartons passing thereunder, while the upper open ends of the slots are in a plane of such height that the axes of the rollers will not pass out of the slots when the highest carton to be sealed by the machine passes under the lower stretch of the belt 131. It will be understood, of course, that the several sprocket-chains are geared to the several shafts by means of gearing, calculated to time the several parts as desired and as necessary in the operation of the machine, and that chain-tightening devices of any suitable construction are employed where necessary. As such tightening devices form no part of the invention, they need not be described in detail.

Any suitable or usual means are provided for throwing on and off the power, through the manipulation of the usual shifting lever 139 (Fig. 1ᵇ), which is thrown from left to right to stop the machine. As the specific construction of this throw-out mechanism forms no part of the present invention, it need not be specifically described.

For the purpose of automatically stopping the machine in case the end flaps are not properly folded at the point where they pass to the glue rolls, means are provided whereby the said flaps engage and raise a forwardly projecting part 140 (Fig. 1ª), which also actuates the throw-out mechanism to cut off the power from the machine.

*Operation.*—The particular style of carton which the machine is here shown as operating upon, is a packing case 141, in which merchandise in packages is packed as illustrated by the dotted line outline in Fig. 3. But it will be understood that while, in the present instance, the invention is shown as operating upon packing cases, the invention is not limited to this particular style of carton, and it will also be understood that while, in the description of the invention, I have used the term "carton", I have used the same in the sense of a paper or fiber box, in which the goods are directly packed, or in the sense of a packing-case or packing-box, in which other cartons of smaller sizes are packed for shipment.

The filled cartons are delivered in any suitable manner to the belt 86. Preferably, and as here shown, they are delivered by a properly driven conveyer belt 102 passing over roller 142 (see left-hand end of Fig. 1). The cartons to be operated upon by the machine may vary in height, and for the purpose of illustrating the invention, I have here shown cartons of two different heights. These cartons of different heights may be delivered to the belts 86 in promiscuous order, it making absolutely no difference whether two cartons of the same height succeed each other; whether cartons of different heights alternate; or whether they come in any other irregular order. As the cartons are advanced upward by the belt 86, the column or row of cartons is stopped by the engagement of the forward carton in the row with the stop 89 (Figs. 1 and 5), and at the proper instant, the forward carton is pushed off of this stop, and is then advanced by the belt 86 onto the more rapidly moving belts 87, over the intervening roller 88, which prevents the cartons from tipping backward as they are delivered to the belts 87, if the belt 86 is inclined, as shown in Fig. 1, as it preferably is. The forward carton is arrested on the quickly moving belts 87 by the stop 93, from which stop it is disengaged by the action of the pusher 95. The parts are so timed that this release of the forward carton occurs before the follower 6 on the conveyer chain 5 comes into operative position, and the carton is quickly advanced by the belts 87, until its forward portion rests on the rails of the track 3, 3, its rearward portion being supported by the fingers or arms 101, shown in Fig. 4. Here the carton comes to rest, and awaits the arrival behind it of the follower 6, which then advances it along the track 3 past the flap-sealing devices, the forward flap being folded by a tapered plate 143 (see Fig. 15), the rear end flap by the tucker 42, and the side flaps opened outward by said tapered plate 143, as illustrated in the perspective diagram of Figs. 15 and 16, after which the opened side flaps pass under the glue-rolls 61, 61, and the side flap to be first folded in passes over the glue roll 62. The glue rolls 61, 61, act to apply glue to the forward portions of the two side flaps, and are then quickly raised by the cams 74 and 76, so that no glue is applied to the intermediate portions of the flaps, and are again lowered to apply glue to the rear portion of said side flaps, the roller 62, however, acting to apply a continuous strip of glue on the under-side of the flap engaged by it. The manner in which the glue is applied to the side flaps is clearly illustrated in Fig. 17. As the carton emerges from under the rolls, the two end flaps are held depressed by the forwardly extending plate or retainer 81, and the side flap which had the glue applied to the under edge thereof is immediately engaged and folded over by the folder 82, and immediately thereafter the other side flap is engaged and folded over by the folder 83, and as the carton passes from these folders, the flaps are engaged by the gravity-actuated pressure bars 84 to retain them in their closed position (see Figs. 1ᵇ and 19). While the glue rolls are acting to apply glue to the side flaps, said flaps are suitably supported on their under-side by the corrugated rolls 80, 80 (Fig. 3). As the cartons pass under the second set of gravity-actuated pressure bars 84, they are carried by the follower 6 on the conveyer chain 5, onto the rear end portions of the quickly moving belts 103 (see Figs. 1ᵇ and 6). As these belts move more rapidly than the conveyer-chain 5, the carton is quickly carried forward, away from the follower, so that when the latter passes downward around the sprocket wheel 12, it does so without contact with, and hence without injury to, the carton. The carton is delivered by the belts 103 onto the belt 132, where it is firmly supported at the bottom by the belt passing over the closely spaced rollers 136. The belt 131 at this time rests upon the top of the carton, and the heavy pressure rolls 137 are in position, with their axes resting in the slots 138, to rest with their full weight upon the smallest carton designed to be passed through the machine, and as the carton advances, the roll is lifted, through the medium of the belt 131, thereby avoiding a crushing blow upon the corner of the carton, which would tend to disfigure, and possibly break it, and this occurs whether a high or a low carton passes under the rolls, 137. The series of rolls 137 is of such length, and the rate of movement of the cartons by the belt 131 is such, that by the time the cartons reach the forward or delivery end of the belt, the glue has entirely set, and the carton is delivered from the machine in any suitable way, preferably on a carrier for removing it from the end of the machine.

Turning now to Figs. 1ᵃ and 12, it will be observed that at each revolution of the shaft 17, the cams 18 operate to raise the track 3, 3, into its elevated or highest position, and the arm 25 engages the cam 23 and turns the shaft 20, so as to throw the fingers or arms 19 under the track to support the same, the shaft 31 being turned by the spring 38, so as to cause the catch 30 to engage the stud 29, and thus hold the arms or fingers 19 under the track. This occurs at each revolution of the shaft 17, unless the preceding carton has been one of the lower cartons, in which case the track remains elevated, and the cams 18 act idly, and the other parts remain in position to support the track. If, now, while the track is in its elevated position, a high carton is advanced onto the track, its side flaps are held in approximately a vertical position by the guide rails 40, 40, and when in this position they engage the levers 37, 37, on either side, and act through the intervening elements to disengage the catch 30 from the pin 29, and as the carton continues to advance, said carton engages the rolls 28 on either side, and swings them forward and outward, thus carrying the arms or fingers 19 from under the track, and permitting it to fall by gravity, with the rolls 15 resting upon the smaller diameter of the cams 18. At this height, the track is in proper position to bring the flaps of the carton into the proper plane to be acted upon by the glue-applying and flap-folding devices. Immediately after the carton leaves the track at the rear end, the cams 18 again act to elevate the track, and if a high carton is next delivered to the track, the operation is repeated, the track being again released and dropped into its lower position, as just described. If, however, a low carton is next delivered to the track, its upwardly projecting side flaps pass under the lever arms 37, and hence the catch 30 is not actuated to release the stop pin 29, and the rollers 28 therefore cannot swing forward and outward, and consequently the fingers or arms 19 remain in position to support the track. The carton, however, passes between the two rolls 28, by pressing said rolls forcibly outward against the springs 32, after which the springs promptly return the rolls to their normal position. By this means, it is insured that the track will always be at the proper height to bring the flaps of the carton into the proper plane to be acted upon by the glue-applying and folding devices, whether the carton be a high or a low one.

It will be understood that the timing of the parts is such that there is never but one carton at a time upon the track.

By reason of the fact that the belt 131 is a loose or sagging belt, and by reason of the other fact that the pressure rolls 137 are free to have a considerable vertical movement, the pressure rolls are likewise adjustable to the different heights of cartons, and the upwardly and forwardly inclined shape of the slots 138 permits the roll to be moved forward slightly when a high carton is being presented thereto at its forward edge, as illustrated in Fig. 8, where the middle roll is shown as having come up the inclined belt 137, and just rising easily over the forward upper corner of the carton.

While I have thus described my invention with considerable detail, in order that the same may be readily understood, it will be appreciated that the invention is not limited to the precise details of construction shown, but that the skilful mechanic may vary the construction within wide margins, without departing from the invention itself, and such variations as fall within the terms of the claims hereinafter appended are intended to be included in, and do form a part of, my said invention.

What is claimed is:—

1. In a machine of the character described, the combination of a series of top-flap sealing devices, a vertically adjustable track, means operable during the movement of the machine to adjust said track, and means advancing cartons along said track and past said sealing devices.

2. In a machine of the character described, the combination of a series of top-flap sealing devices, a track, means automatically adjusting said track vertically during the operation of the machine, and means advancing cartons along said track and past past said sealing devices.

3. In a machine of the character described, the combination of a series of top-flap sealing devices, a vertically adjustable track, means operable during the movement of the machine to adjust said track, means supplying cartons one at a time to said track, and means advancing cartons along said track and past said sealing devices.

4. In a machine of the character described, the combination of a series of top-flap sealing devices, a track, means automatically adjusting said track vertically during the operation of the machine, means supplying cartons one at a time to said track, and means advancing cartons along said track and past said sealing devices.

5. In a machine of the character described, the combination of a series of top-flap sealing devices, a vertically adjustable track, means automatically operated by the carton and controlling said adjustment, means supplying cartons one at a time to said track, and means advancing cartons along said track and past said sealing devices.

6. In a machine of the character described, the combination of a series of top-flap sealing devices, a vertically adjustable track, means supporting said track in its uppermost position, means operated by the cartons and releasing the track-supports, means supplying cartons one at a time to said track, and means advancing the cartons along said track and past said sealing devices.

7. In a machine of the character described, the combination of a series of top-flap sealing devices, a vertically adjustable track, means supporting said track in its uppermost position, devices normally locking said track-supports against movement, means actuated by the cartons to unlock said track-supports, means supplying cartons one at a time to said track, and means advancing the cartons along said track and past said sealing devices.

8. In a machine of the character described, the combination of a series of top-flap sealing devices, a vertically adjustable track, means for elevating said track, means supporting said track in its elevated position, carton-actuated devices for releasing said track-supporting means, and means advancing the cartons along said track and past said sealing devices.

9. In a machine of the character described, the combination of a series of top-flap sealing devices, a vertically adjustable track, means for elevating said track, means supporting said track in its elevated position, locking devices securing said supporting means in position to hold the track elevated, carton-actuated mechanism tripping said locking devices, carton-actuated devices for releasing said track-supporting means, and means advancing the cartons along said track past said sealing devices.

10. In a machine of the character described, the combination of a series of top-flap sealing devices, a vertically adjustable track for supporting the cartons, means operable during the movement of the machine to adjust said track, a conveyer provided with followers for advancing the cartons along said track past said sealing devices, and means in alinement with said track and conveyer and advancing the cartons one at a time onto said track in front of said followers.

11. In a machine of the character described, the combination of a series of top-flap sealing devices, a vertically adjustable track for supporting the cartons, means operable during the movement of the machine to adjust said track, a conveyer chain provided with followers for advancing the cartons along said track past said sealing devices, and means in alinement with said track and chain and advancing the cartons one at a time onto said track in front of said followers.

12. In a machine of the character described, the combination of a series of top-flap sealing devices, a vertically adjustable track for supporting the same, a continuously moving conveyer chain provided with followers for advancing the cartons along said track past said sealing devices, a pair of continuously moving parallel feed belts in alinement with said track and with their forward end portions on opposite sides of the rear end portion of the conveyer chain whereby the cartons are advanced in a straight line onto said track in front of said followers and past said sealing devices.

13. In a machine of the character described, the combination of a series of top-flap sealing devices, a vertically adjustable track for supporting the cartons, means operable during the movement of the machine to adjust said track, a conveyer chain provided with followers for advancing the cartons along said track past said sealing devices, a pair of parallel belts in alinement with said track and with their forward end portions on opposite sides of the rear end portion of said conveyer chain, and means imparting a forward movement to said belts in excess of the forward movement of said conveyer chain.

14. In a machine of the character described, the combination of a series of top-flap sealing devices, a vertically adjustable track for supporting the cartons, means operable during the movement of the machine to adjust said track, a conveyer provided with followers for advancing the cartons along said track past said sealing devices, a pair of parallel feed belts in alinement with said track and with their forward end portions on opposite sides of the rear end portion of said conveyer, a stop engaging each of the cartons as it is advanced by said belts, and means releasing the cartons one at a time from said stop.

15. In a machine of the character described, the combination of a series of top-flap sealing devices, a vertically adjustable track, means for raising said track to its elevated position, track-supporting means sustaining the track in said elevated position, means actuated by the carton for withdrawing said track-supporting means consisting of yielding abutments in the path of the cartons, catch mechanism locking said supporting means in position to support the track, and means advancing the cartons along said track past said sealing devices.

16. In a machine of the character described, the combination of top-flap sealing devices, a vertically adjustable track, means for raising the same to its elevated position, track-supporting means for sustaining it in said elevated position, catch mechanism locking said track-supporting means in position to support the track, catch-operating devices in an elevated position above the track in a position to be engaged by the higher cartons, but to permit the lower cartons to pass thereunder, whereby said track will be permitted to fall only when a high carton is in position thereon, and means advancing the cartons one at a time along said track past said sealing devices.

17. In a machine of the character described, the combination of a series of top-flap sealing devices, a vertically adjustable track, means operable to effect adjustment of the track during movement of the machine, means for advancing cartons one at a time along said track past said sealing devices, and means removing the cartons from said track after they have passed said sealing devices.

18. In a machine for sealing cartons of different heights, the combination of a series of top-flap sealing devices, with a carton support adjustable into a plurality of horizontal planes, means advancing the cartons along said support past said sealing devices, means effecting such adjustment during the operation of the machine, and means removing the cartons from said support after they have passed said sealing devices.

19. In a machine for sealing cartons of different heights, the combination of a series of top-flap sealing devices, a carton support adjustable into a plurality of horizontal planes, means advancing the cartons along said support past said sealing devices in each of the horizontal planes to which it may be adjusted, automatic means for adjusting said support during the operation of the machine, with carton-feeding and carton-delivery mechanism in the same horizontal plane with said carton support in one of its adjusted positions.

20. In a machine for sealing cartons of different heights, the combination of a series of carton-sealing devices, with means simultaneously advancing cartons of different heights past said sealing devices with the flaps of the different-height cartons in the same horizontal plane during the sealing operation, and means supplying cartons one at a time to said carton-advancing means.

21. In a carton-sealing machine, the combination of a series of carton-sealing devices and a conveyer for moving the cartons past said devices, with carton-feeding devices, said feeding devices consisting of a feed belt, a carton stop arranged near the delivery end of said belt, carton-advancing means intermediate said belt and said conveyer, a carton stop arranged in operative relation with said intermediate carton-advancing means, and mechanism simultaneously actuating said stops to release the cartons therefrom.

22. In a machine for sealing cartons, the combination of a series of carton-sealing devices, a conveyer for advancing the cartons past said sealing devices, a feed belt for carrying cartons to the machine, a plurality of parallel carton-advancing belts intermediate said feed belt and said conveyer, a carton stop over the delivery end of said feed-belt, a carton stop over one of said intermediate belts, and automatic means for releasing the cartons from each of said stops.

23. In a machine in the character described, the combination of a series of top-flap sealing devices, a vertically adjustable track, means operable during the movement of the machine to adjust said track, a conveyer provided with followers advancing the cartons along said track past said sealing devices, carton delivery mechanism for delivering the cartons from said track, the same consisting of a pair of parallel belts with their rear end portions arranged on opposite sides of the front end portion of said conveyer, and means moving said belts at a speed in excess of that of said conveyer.

24. In a machine of the character described, the combination of a series of top-flap sealing devices, a vertically adjustable track, means operable during the movement of the machine to adjust said track, a conveyer provided with followers advancing the cartons along said track past said sealing devices, a pair of parallel belts in alinement with said track and with their rear end portions on opposite sides of said conveyer, and means moving said belts at a speed in excess of that of the speed of said conveyer.

25. In a machine of the character described, the combination of a series of top-flap sealing devices, a vertically adjustable track, means raising said track into its elevated position, means supporting said track while thus elevated, means actuated by a carton before it reaches said sealing devices for withdrawing the supports from under said track, and means advancing the cartons along said track past said sealing devices.

26. In a machine of the character described, the combination of top-flap gluing and folding devices, means advancing the cartons of different heights past said devices, and a series of pressure rolls for retaining the flaps in their folded position, said rolls having their axes mounted in upwardly and forwardly inclined bearings.

27. In a machine of the character described, the combination of glue-applying and top-flap holding devices, means advancing the cartons of different heights past said devices, a series of pressure rolls for holding the flaps in folded position, said rolls having their axes mounted in upwardly and forwardly inclined bearings, and a flexible sheet between said rolls and the top flaps of said cartons.

28. In a machine of the character described, the combination of glue-applying and top-flap folding devices acting on cartons of different heights, a series of pressure rolls for holding the flaps in folded position, said rolls having their axes in forwardly and upwardly inclined bearings, a flexible belt interposed between said rolls and the top flaps of the cartons, and means passing said cartons past said glue-applying and folding devices and said pressure rolls.

29. In a machine of the character described, the combination of top-flap sealing devices, a vertically adjustable track, means operable during the movement of the machine to adjust said track, a conveyer provided with followers advancing the cartons along said track past said sealing devices, and means supplying the cartons one at a time in front of said followers.

30. In a machine of the character described, the combination of top-flap sealing devices, a carton-supporting track adjustable into a plurality of horizontal planes, means effecting said adjustment during the operation of the machine, a conveyer provided with followers advancing the cartons along said track past said sealing devices, means in alinement with said track and supplying cartons in front of said followers, a stop operated in connection with said carton-supplying means, and stop-actuating mechanism for freeing the cartons from said stops when, and only when, said track is in the same horizontal plane as said carton-supplying device.

31. In a machine of the character described, the combination of top-flap sealing devices, a carton supporting track adjustable into a plurality of horizontal planes, means operable during the movement of the machine to effect the adjustment of said track, a conveyer provided with followers advancing the cartons along said track past said sealing devices, a pair of carton-feeding belts in alinement with said track and supplying cartons in front of said followers, a carton-stop operating in connection with said belts, and means freeing the carton from said stop when, and only when, the carton-supporting track is in the same horizontal plane as said belts.

32. In a machine of the character described, the combination of top-flap sealing devices, a vertically adjustable track, means operable during the movement of the machine to adjust said track, a conveyer provided with followers advancing the cartons along said track past said sealing devices, and a pair of belts with their forward end portions on opposite sides of said conveyer and supplying the cartons in front of said followers.

In testimony whereof I have signed this specification in the presence of two subscribing witnesses.

FRANK B. MARTIN.

Witnesses:
   HENRY J. BILLTORE,
   B. T. REID.